(12) United States Patent
Chuang et al.

(10) Patent No.: US 10,647,311 B2
(45) Date of Patent: May 12, 2020

(54) SYSTEM AND METHOD FOR MOTOR BRAKE BOOST FUNCTION FAILURE

(71) Applicant: Robert Bosch GmbH, Stuttgart (DE)

(72) Inventors: Chi Chuang, Ann Arbor, MI (US);
Rosalin Irwan, Ann Arbor, MI (US);
Qingyuan Li, Superior Township, MI (US)

(73) Assignee: ROBERT BOSCH GMBH, Stuttgart (DE)

( * ) Notice: Subject to any disclaimer, the term of this patent is extended or adjusted under 35 U.S.C. 154(b) by 235 days.

(21) Appl. No.: 15/808,522

(22) Filed: Nov. 9, 2017

(65) Prior Publication Data

US 2019/0135258 A1    May 9, 2019

(51) Int. Cl.
| | |
|---|---|
| *G06F 7/70* | (2006.01) |
| *B60T 17/22* | (2006.01) |
| *B60T 8/172* | (2006.01) |
| *B60T 13/66* | (2006.01) |
| *B60L 7/18* | (2006.01) |
| *B60L 7/26* | (2006.01) |

(Continued)

(52) U.S. Cl.
CPC .......... *B60T 17/221* (2013.01); *B60L 3/0076* (2013.01); *B60L 7/18* (2013.01); *B60L 7/26* (2013.01);
(Continued)

(58) Field of Classification Search
CPC ........ B60T 17/221; B60T 17/22; B60T 17/18; B60T 13/72; B60T 13/66; B60T 13/52; B60T 8/88; B60T 8/44; B60T 7/12; B60T 1/10; B60T 13/662; B60T 8/172; B60T 2270/402; B60T 2201/03; B60T 8/267; B60T 8/17; B60T 2270/60; B60T 2270/604; B60T 2220/04; B60T 2270/403; B60L 58/10; B60L 3/0076; B60L 15/2009; B60L 7/26; B60L 7/18; B60L 2240/54
(Continued)

(56) References Cited

U.S. PATENT DOCUMENTS 6,286,635 B1 * 9/2001 Tamor ........................ B60L 7/26
180/65.21
6,813,553 B2 * 11/2004 Nakamura ................ B60L 7/16
303/112

(Continued)

FOREIGN PATENT DOCUMENTS

| DE | 102014119329 A1 | 11/2015 |
|---|---|---|
| EP | 0800975 A2 | 10/1997 |

(Continued)

*Primary Examiner* — Shardul D Patel
(74) *Attorney, Agent, or Firm* — Michael Best & Friedrich LLP

(57) ABSTRACT

Systems and methods for a braking a vehicle. In one example, the braking system includes a friction braking system, a regenerative braking system, and an electronic processor. The electronic processor is communicatively coupled to the friction braking system and the regenerative braking system. The electronic processor is configured to receive a driver brake request and determine a brake failure state. The brake failure state indicates a brake failure. In response to determining the brake failure state, the electronic processor applies a braking force based on the driver brake request. The braking force includes a frictional braking force generated by the friction braking system and a regenerative braking force generated by the regenerative braking system.

16 Claims, 4 Drawing Sheets

(51) Int. Cl.
    *B60L 15/20* (2006.01)
    *B60L 3/00* (2019.01)
    *B60L 58/10* (2019.01)
    *B60T 13/52* (2006.01)
    *B60T 1/10* (2006.01)
    *B60T 8/88* (2006.01)
    *B60T 17/18* (2006.01)
    *B60T 8/44* (2006.01)
    *B60T 13/72* (2006.01)
    *B60T 7/12* (2006.01)
    *B60T 8/17* (2006.01)
    *B60T 8/26* (2006.01)

(52) U.S. Cl.
    CPC .......... *B60L 15/2009* (2013.01); *B60L 58/10* (2019.02); *B60T 1/10* (2013.01); *B60T 7/12* (2013.01); *B60T 8/172* (2013.01); *B60T 8/44* (2013.01); *B60T 8/88* (2013.01); *B60T 13/52* (2013.01); *B60T 13/66* (2013.01); *B60T 13/662* (2013.01); *B60T 13/72* (2013.01); *B60T 17/18* (2013.01); *B60T 17/22* (2013.01); B60L 2240/54 (2013.01); *B60T 8/17* (2013.01); *B60T 8/267* (2013.01); *B60T 2201/03* (2013.01); *B60T 2220/04* (2013.01); *B60T 2270/402* (2013.01); *B60T 2270/403* (2013.01); *B60T 2270/60* (2013.01); *B60T 2270/604* (2013.01)

(58) Field of Classification Search
    USPC ............ 701/70, 33.7, 33.9; 180/65.31, 65.2, 180/65.1; 303/3, 122.12, 20; 188/106 R
    See application file for complete search history.

(56) References Cited

U.S. PATENT DOCUMENTS

| | | | | |
|---|---|---|---|---|
| 8,090,515 | B2* | 1/2012 | Jeon | B60T 1/10 |
| | | | | 701/81 |
| 9,352,744 | B2* | 5/2016 | Zhao | B60L 7/18 |
| 10,189,476 | B1* | 1/2019 | Edren | B60W 30/18127 |
| 2007/0267915 | A1* | 11/2007 | Shimada | B60K 6/44 |
| | | | | 303/122 |
| 2007/0273204 | A1* | 11/2007 | Kodama | B60K 6/48 |
| | | | | 303/146 |
| 2008/0136252 | A1* | 6/2008 | Ro | B60K 6/485 |
| | | | | 303/113.4 |
| 2014/0316642 | A1* | 10/2014 | Kim | B60T 17/221 |
| | | | | 701/33.9 |
| 2014/0324283 | A1* | 10/2014 | Kim | B60T 17/22 |
| | | | | 701/33.9 |
| 2014/0333123 | A1* | 11/2014 | Kunz | B60L 7/26 |
| | | | | 303/3 |
| 2015/0001916 | A1* | 1/2015 | Murayama | B60T 13/586 |
| | | | | 303/3 |
| 2015/0203117 | A1* | 7/2015 | Kelly | B60K 31/02 |
| | | | | 701/91 |

FOREIGN PATENT DOCUMENTS

| | | |
|---|---|---|
| EP | 2998173 A1 | 3/2016 |
| GB | 2502803 A | 12/2013 |
| JP | 2014208498 A | 11/2014 |
| JP | 2014208526 A | 11/2014 |
| JP | 2014213628 A | 11/2014 |
| JP | 2015110378 A | 6/2015 |
| WO | 2014188923 A1 | 11/2014 |

\* cited by examiner

SYSTEM AND METHOD FOR MOTOR BRAKE BOOST FUNCTION FAILURE

FIELD

Vehicles include braking systems in order to slow and stop the vehicle. Many vehicles utilize a frictional braking system, for example, a hydraulic system that forces brake pads against rotors, to provide a mechanical or frictional braking force to reduce the vehicle's speed. Such systems may include a brake booster. The brake booster provides additional braking power, typically proportional to the amount of force a driver exerts on the brake pedal.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed subject matter, and explain various principles and advantages of those embodiments.

Figure 1:
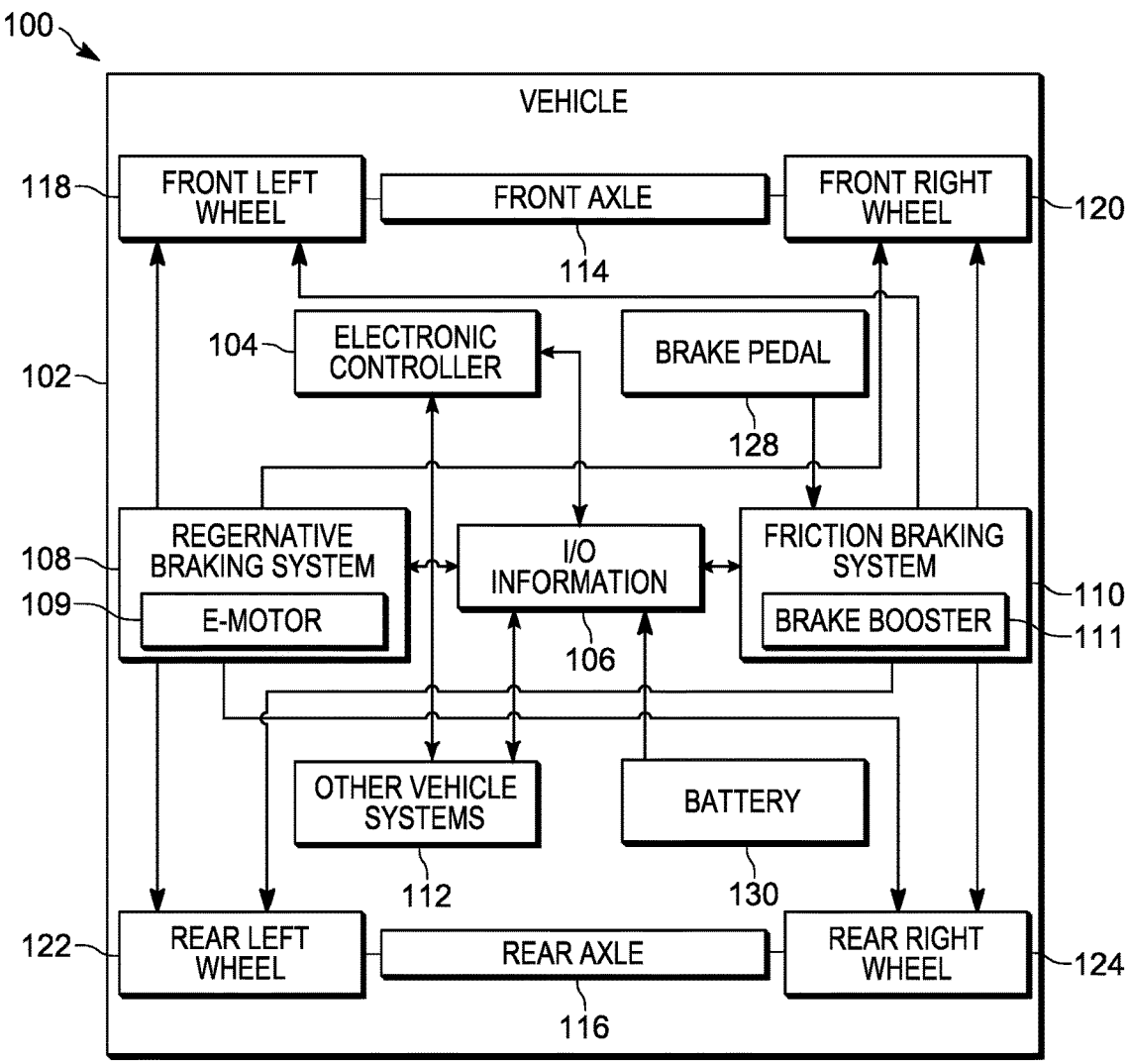
FIG. 1 is a block diagram of a braking system for a vehicle, according to some embodiments.

The apparatus and method components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

DETAILED DESCRIPTION

During a brake system failure, the brake system of the vehicle may require extra braking force in order to stop the vehicle within a certain distance. For example, when the brake booster fails, additional brake force may be required from the driver in order to compensate for the lacking brake force. Less braking force may increase the stopping distance of the vehicle. Some vehicles, for example electric and hybrid vehicles, include regenerative braking systems. Additional braking force may be sourced from the regenerative braking system in order to compensate for the braking force lost due to the brake booster failure.

One embodiment presented herein includes a braking system. The braking system includes a friction braking system, a regenerative braking system, and an electronic processor. The electronic processor is communicatively coupled to the friction braking system and the regenerative braking system. The electronic processor is configured to receive a driver brake request and determine a brake failure state. The brake failure state indicates a brake failure. In response to determining the brake failure state, the electronic processor applies a braking force based on the driver brake request. The braking force includes a frictional braking force generated by the friction braking system and a regenerative braking force generated by the regenerative braking system.

Another embodiment provides a method for braking a vehicle. The method includes receiving a driver brake request, the driver brake request including a mechanical braking force and determining a brake failure state, the brake failure state indicating a brake failure. The method further includes, in response to determining the brake failure state, applying a braking force based on the driver brake request. The braking force includes a hydraulic braking force generated by a friction braking system and a regenerative braking force generated by a regenerative braking system.

Before any embodiments are explained in detail, it is to be understood that the examples presented herein are not limited in their application to the details of construction and the arrangement of components set forth in the following description or illustrated in the following drawings. Embodiments may be practiced or carried out in various ways.

It should also be noted that a plurality of hardware and software based devices, as well as a plurality of different structural components may be used to implement the embodiments presented herein. In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects may be implemented in software (for example, stored on non-transitory computer-readable medium) executable by one or more processors. As such, it should be noted that a plurality of hardware and software based devices, as well as a plurality of different structural components may be utilized to implement the embodiments presented. For example, "control units" and "controllers" described in the specification can include one or more processors, one or more memory modules including non-transitory computer-readable medium, one or more input/output interfaces, and various connections (for example, a system bus) connecting the components.

For ease of description, each of the example systems presented herein is illustrated with a single exemplar of each of its component parts. Some examples may not describe or illustrate all components of the systems. Other embodiments may include more or fewer of each of the illustrated components, may combine some components, or may include additional or alternative components.

FIG. 1 is a block diagram of one exemplary embodiment of a braking system 100. The braking system 100 is included in a vehicle 102. In the example illustrated, the braking system 100 includes an electronic controller 104, an input/output (I/O) interface 106, a regenerative braking system 108, a friction braking system 110, and other vehicle systems 112. The vehicle 102 further includes a front axle 114, a rear axle 116, a front left wheel 118, a front right wheel 120, a rear left wheel 122, a rear right wheel 124. The front left and right wheels 118 and 120 are coupled to the front axle 114. Likewise, the rear left and right wheels 122 and 124 are coupled to the rear axle 116. The electronic controller 104, the regenerative braking system 108, the friction braking system 110, and the other vehicle systems 112, as well as other various modules and components of the vehicle 102 are coupled to each other by or through one or more control or data buses (for example, a CAN bus), which enable communication therebetween. The use of control and data buses for the interconnection between and exchange of information among the various modules and components would be apparent to a person skilled in the art in view of the description provided herein.

In some embodiments, the electronic controller 104 includes a plurality of electrical and electronic components that provide power, operational control, and protection to the components and modules within the electronic controller 104. The electronic controller 104 includes, among other things, an electronic processor (for example, an electronic microprocessor, microcontroller, or other suitable programmable device), and a memory (not shown). The electronic controller 104 is also connected to the input/output interface 106. The electronic processor, the memory, and the input/output interface 106, as well as the other various modules are connected by one or more control or data buses. In some embodiments, the electronic controller 104 is implemented partially or entirely in hardware (for example, using a field-programmable gate array ("FPGA"), an application specific integrated circuit ("ASIC"), or other devices.

The memory can include one or more non-transitory computer-readable media, and includes a program storage area and a data storage area. As used in the present application, "non-transitory computer-readable media" comprises all computer-readable media but does not consist of a transitory, propagating signal. The program storage area and the data storage area can include combinations of different types of memory, for example, read-only memory ("ROM"), random access memory ("RAM"), electrically erasable programmable read-only memory ("EEPROM"), flash memory, or other suitable digital memory devices. The electronic processor is connected to the memory and executes software, including firmware, one or more applications, program data, filters, rules, one or more program modules, and other executable instructions. The electronic processor retrieves from the memory and executes, among other things, instructions related to the control processes and methods described herein. In other embodiments, the electronic controller 104 may include additional, fewer, or different components.

The regenerative braking system 108 is coupled to an electric motor (e-motor) 109. The regenerative braking system 108 is configured to perform regenerative braking during braking maneuvers of the vehicle 102. Specifically, the regenerative braking system 108, during a braking maneuver, causes the e-motor 109 to act as a generator and stores or redistributes the power generated by the e-motor 109. The act of generating power creates a braking torque on the e-motor 109 that is transmitted to one or more of the wheels 118, 120, 122, and 124 that the e-motor 109 is coupled to slow and/or stabalize the vehicle 102. In some embodiments, the regenerative braking system 108 may include more than one e-motor 109 each coupled or connected to at least one of the wheels 118, 120, 122, and 124. For example, one e-motor may be connected to the front left wheel 118 and a second e-motor may be connected to the front right wheel 120. It should be understood any number of connections with any number of motors connected to any number of tires is possible in further embodiments.

The friction braking system 110 is a braking system that utilizes a frictional braking force to inhibit the motion of one or more of the wheels 118, 120, 122, and 124 in order to slow and/or stop the vehicle 102. For example, some or all of the wheels 118, 120, 122, and 124 are fitted with brake pads which apply a frictional braking force that inhibits the motion of the wheels 118, 120, 122, and 124. In some embodiments, the friction braking system 110 is a conventional hydraulic braking system. The friction braking system 110 may include a brake booster 111. The brake booster 111 is configured to increase the force the brake pedal 128 exerts on the wheel 118, 120, 122, 124 of the vehicle 102.

The vehicle 102 is a vehicle that includes a regenerative braking system 116, for example a hybrid or electric vehicle. In such an embodiment, the vehicle 102 may further include a battery 130. The battery 130 provides power to the e-motor 109 of the system 100. In some embodiments, the vehicle 102 is an autonomous or self-driving car. In other embodiments, the vehicle 102 requires human input to drive. In such embodiments, the system 100 includes a brake pedal 128. The brake pedal 128 may be connected to the friction braking system 110. The vehicle 102 may be a two wheel or four wheel drive system.

The other vehicle systems 112 include controllers, sensors, actuators, and the like for controlling aspects of the operation of the vehicle 102 (for example, acceleration, braking, shifting gears, and the like). The other vehicle systems 116 are configured to send and receive data relating to the operation of the vehicle 102 to and from the electronic controller 104.

Figure 2:
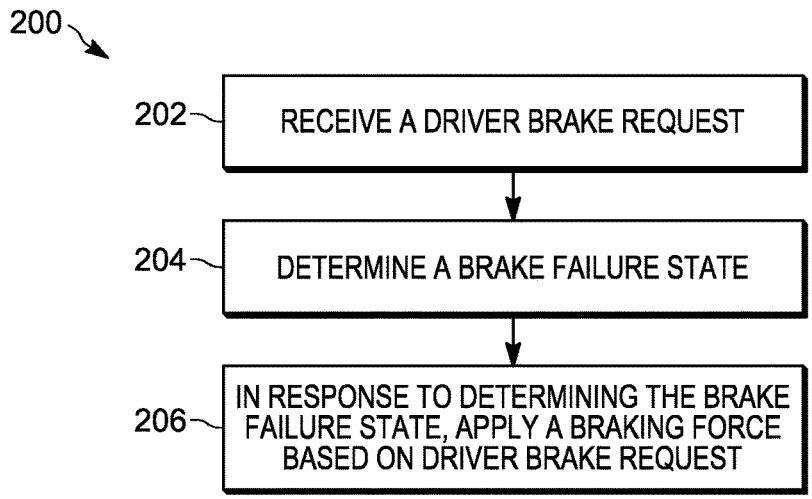
FIG. 2 is a flow chart of method of operating the braking system of FIG. 1, according to some embodiments.
Figure 3:
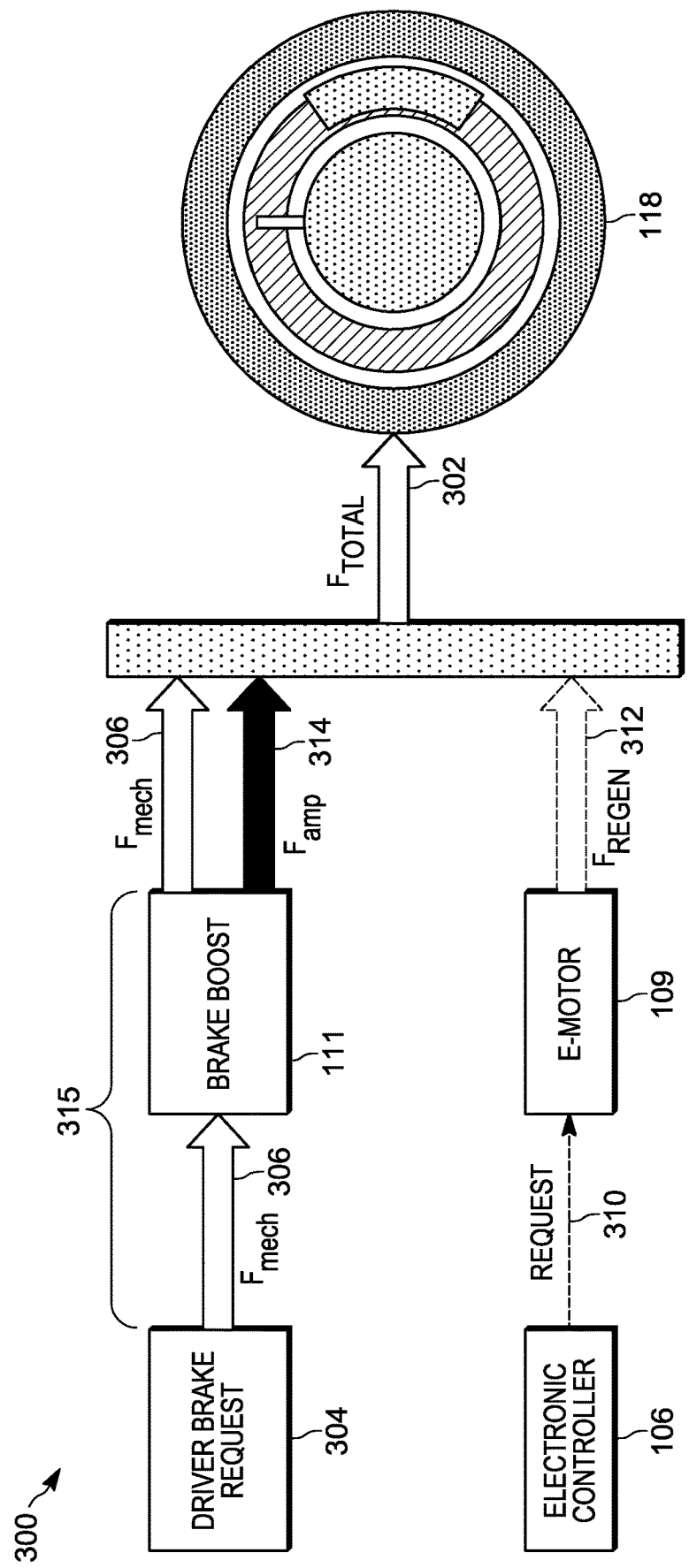
FIG. 3 is a block diagram illustrating a total braking force applied to a wheel of the braking system of FIG. 1 according to the method of FIG. 2, according to some embodiments.

FIG. 2 is a flowchart of a method 200 for the braking system 100. At block 202, the electronic controller 104 receives, as illustrated in FIG. 3, a driver brake request 304. FIG. 3 is a block diagram 300 illustrating a total braking force 302 applied to a wheel (for example, the front left wheel 118) of the braking system 100 according to the method 200 of FIG. 2. As illustrated in FIG. 3, the driver brake request 304 produces a mechanical force 306. The mechanical force 306 is used by the brake booster 111 to produce an amplified braking force 314. The amount of amplified braking force 314 may be the resultant force from the brake booster 111 (FIG. 1) in response and/or proportional to the mechanical force 306. The mechanical force 306 may be produced by a driver of the vehicle 102 that applies force to the brake pedal 128. In other frictional brake systems, the brake pedal is not directly linked to a hydraulic system, but instead is simply an input device where movement of the brake pedal is converted to an electric signal that may be used to generate the driver brake request 304 to control the braking system. For example, in some instances the signal may be provided to a hydraulic pump to increase a brake pressure or in other instances the signal is provided to electric motors that cause a caliper to open and close with respect to a brake rotor. In some embodiments, the driver brake request 304 is automatically generated by the vehicle 102 and the mechanical braking force 306 is applied automatically, for example, using an automated braking system (not shown).

Additionally, in response to the driver brake request, the electronic controller 104 provides a command 310 to the regenerative braking system 108 to generate a regenerative braking force 312. Thus, during normal operation of the braking system 100, the total force 302 includes the regenerative braking force 312 from the regenerative braking system 110 and the frictional braking force 315 from the frictional braking system 110. During normal operation the frictional braking force 315 includes both the mechanical force 306 and the amplified braking force 314. However, as explained in more detail below, the frictional braking force 315 may include only the mechanical force 306 or the amplified braking force 314.

It should be understood that although the total braking force 302 and its components are illustrated in FIG. 3 as being applied to one wheel, it should be understood that the total braking force 302 may also refer to overall braking force produced for all the wheels of the vehicle 102 and that the frictional braking force 315 and the regenerative braking force 312 may also refer to the sum of the braking force produced for all the wheels of the vehicle 102 by the braking systems 110 and 108 respectively.

Figure 4A:
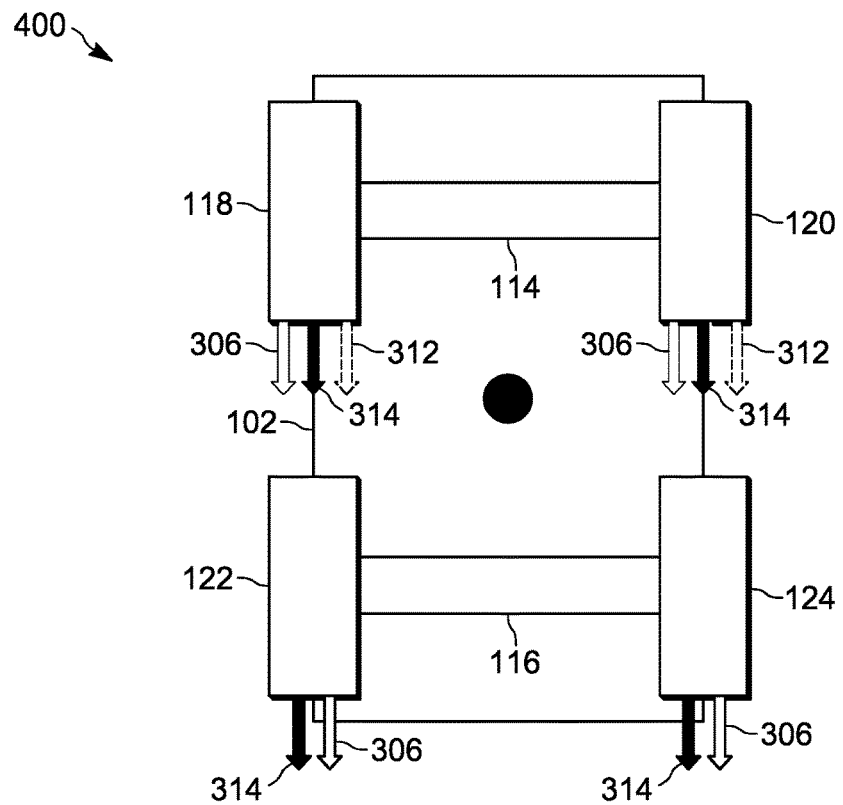
FIG. 4A is a block diagram illustrating a no brake failure state of the braking system of FIG. 1, according to some embodiments.

FIG. 4A illustrates a no brake failure state 400. In a no brake failure state, the regenerative braking system 108 produces the regenerative braking force 312 and the friction braking system 110 produces a frictional braking force 315 including both the mechanical force 306 and the amplified brake force 314.

Figure 4B:
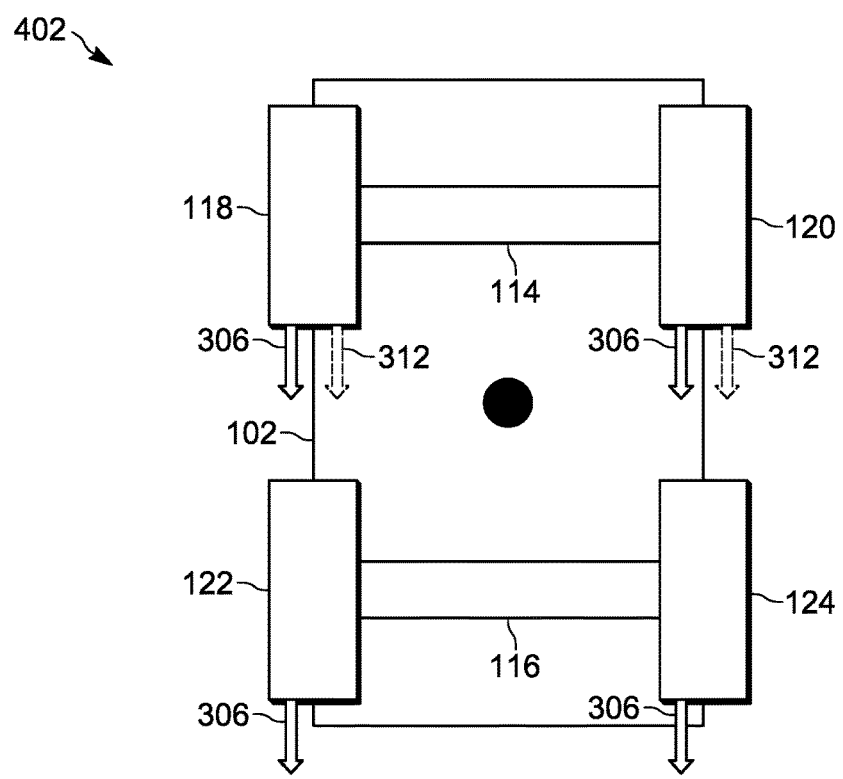
FIG. 4B is a block diagram illustrating a brake failure state of the braking system of FIG. 1, according to some embodiments.
Figure 4C:
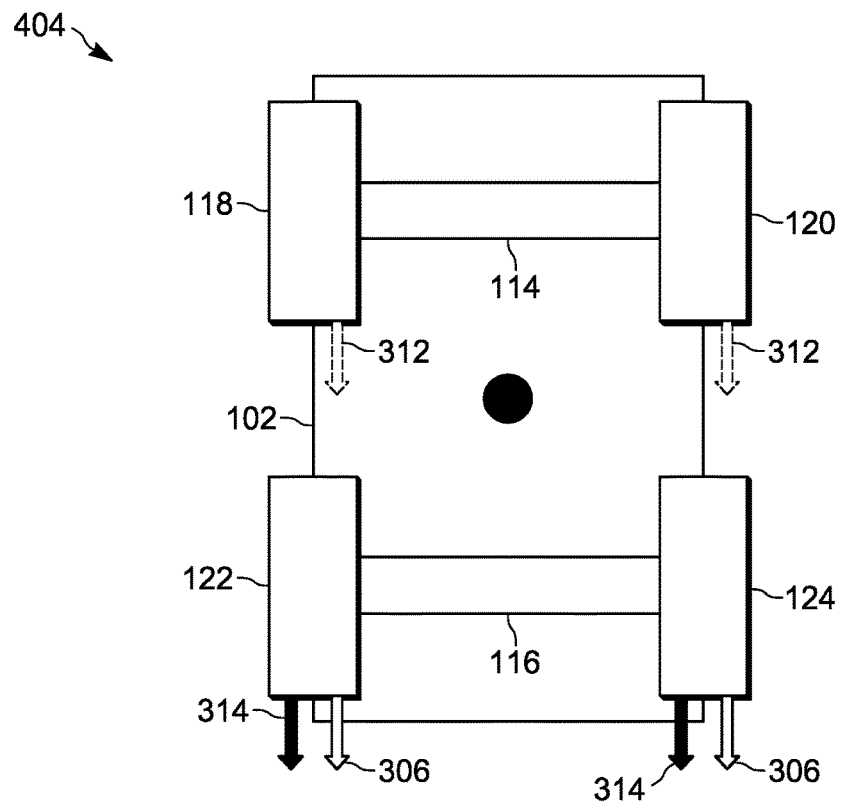
FIG. 4C is a block diagram illustrating a brake failure state of the braking system of FIG. 1, according to some embodiments.
Figure 4D:
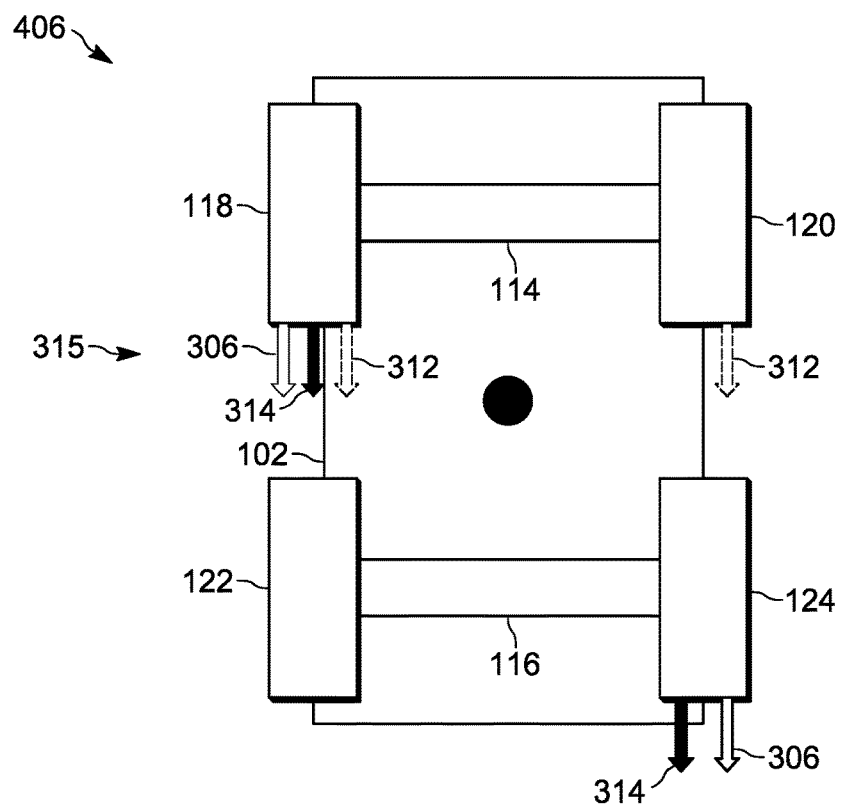
FIG. 4D is a block diagram illustrating a brake failure state of the braking system of FIG. 1, according to some embodiments.

Returning to FIG. 2, at block 204, the electronic controller 104 determines a brake failure state (described in more detail in regard to FIGS. 4B-4D). The brake failure state is a failure in the braking system 100. In some embodiments, the determining the brake failure state may include determining a failure of functionality of the brake booster 111. In response to determining the brake failure state, at block 206, the electronic controller 104 applies a braking force 302 (see FIG. 3) to one or more of the wheels (for example 118, 120, 122, and/or 124) based on the drive brake request 304.

FIGS. 4B through 4D each illustrate a different kind of brake failure state. In some embodiments, determining the brake failure state may include determining whether the brake failure state is a single brake circuit failure or a brake boost system failure (for example, a failure within the frictional braking system 108). As illustrated in FIG. 4B, in the case of a brake boost system failure, when the brake failure state is a brake boost system failure state 402, the amplified brake force 314 may be unavailable or, if available, may not be of sufficient magnitude to slow the vehicle 102. In this case, the regenerative braking force 312 is applied to the tires of a single axle (for example, either the front axle 114 or the rear axle 116) of the vehicle 102 and the mechanical force 306 is applied to all the tires 118, 120, 122, and 124.

In the case of a single brake circuit failure, the frictional braking force 315 for one or more of the tires 118, 120, 122, and 124 may be unavailable or, if available, may not be of sufficient magnitude to slow the vehicle 102. In such a case, the regenerative braking force 312 may be applied to a single axle (for example, either the front axle 114 or the rear axle 116) while the frictional braking force 314 (including both the mechanical braking force 306 and the amplified braking force is applied to the tires 118, 120, 122, and 124 so long as the single circuit failure has not affected the circuit between the particular tire and the frictional braking system 108. In some embodiments, the friction braking system 110 may be a vertical split brake system or a diagonal split system. In a vertical split brake system (also called a front and rear split system), the tires 118 and 120 on the front axle 114 are coupled to one brake circuit while the tires 122 and 124 are coupled to a second brake circuit. In a diagonal split brake system, the tires 118 and 124 are coupled to one brake circuit while the tires 120 and 122 are coupled to a second brake circuit. In either case, a failure in one of the circuits results in a loss of braking force applied on two tires.

As illustrated in FIG. 4C, when the friction braking system 110 is a vertical split brake system (when the brake failure state is a vertical split brake failure state 404), the regenerative braking force 312 is applied on a single axle (for example, either the front axle 114 or the rear axle 116) of the vehicle 102, compensating for the lost frictional braking force 315 on the tires 118 and 120 due to the failure of the corresponding single braking circuit. The frictional braking force 315 resulting from the functional brake circuit (including both the mechanical braking force 306 and the amplified braking force 314) is applied to the tires 122 and 124 on the rear axle 116.

As illustrated in FIG. 4D, when the friction braking system 110 is a diagonal split brake system (when the brake failure state is a diagonal split brake failure state 406), the mechanical force 306 is unavailable. The regenerative braking force 312 is applied to a single axle (for example, either the front axle 114 or the rear axle 116) of the vehicle 102 while the frictional force 314 (including both the mechanical braking force 306 and the amplified braking force 314) is applied to the tires perpendicular to each other depending on the circuit failure (in this case, tires 118 and 124).

In some embodiments, the electronic controller 104 is further configured to determine a battery capacity of the battery 130 of the regenerative braking system 108 and apply the regenerative braking force 312 when the battery capacity exceeds a predetermined charge level.

Thus, embodiments provide, among other things, a braking system and method for a vehicle in case of a braking failure. Various features and advantages of the invention are set forth in the following claims.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized electronic processors (or "processing devices") such as microprocessors, digital signal processors, customized processors and field programmable gate arrays (FPGAs) and unique stored program instructions (including both software and firmware) that control the one or more electronic processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (for example, comprising an electronic processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A braking system for a vehicle comprising:
    a friction braking system configured to provide a frictional braking force to a plurality of wheels of the vehicle;
    a regenerative braking system configured to provide a regenerative braking force to a plurality of wheels of the vehicle; and
    an electronic processor communicatively coupled to the friction braking system and the regenerative braking system, the electronic processor configured to:
    receive a driver brake request;
    determine a brake failure state, the brake failure state indicating a brake failure; and
    in response to determining the brake failure state, control each of the friction braking system and the regenerative braking system to apply a respective braking force based on the driver brake request, wherein a total braking force applied to each of the plurality of wheels includes a ratio of the regenerative braking force and of the frictional braking force, the ratio being determined based on a type of brake failure, a location of each wheel, and a split type of friction braking system.

2. The braking system of claim 1, wherein the friction braking system includes a brake booster and wherein determining the brake failure state includes determining a failure of functionality of the brake booster.

3. The braking system of claim 1, wherein the type of brake failure is one selected from the group consisting of a single brake circuit failure and a brake boost failure.

4. The braking system of claim 3, wherein the electronic processor is further configured to, when the brake failure is the single brake circuit failure and the friction braking system is a vertical split brake system,
    control the regenerative braking system to apply the regenerative braking force to wheels on a single axle of the vehicle and to apply no regenerative braking force to wheels on a second single axle of the vehicle, and
    control the friction braking system to apply the frictional braking force to each of the plurality of wheels.

5. The braking system of claim 3, wherein the electronic processor is further configured to, when the brake failure is the single brake circuit failure and the friction braking system is a diagonal split brake system,
    control the friction braking system to apply the frictional braking force to a first wheel of the vehicle and a second wheel of the vehicle diagonal to the first wheel, and
    control the regenerative braking system to apply the regenerative braking force to wheels on a single axle of the vehicle and to apply no regenerative braking force to wheels on a second single axle of the vehicle.

6. The braking system of claim 3, wherein the electronic processor is further configured to, when the brake failure is a brake boost failure,
    control the regenerative braking system to apply the regenerative braking force to wheels on a single axle of the vehicle and to apply no regenerative braking force to wheels on a second single axle of the vehicle, and
    control the friction braking system to apply no frictional braking force to the plurality of wheels.

7. The braking system of claim 1, wherein the electronic processor is further configured to determine a battery capacity of the regenerative braking system and apply the regenerative braking force when the battery capacity exceeds a predetermined charge level.

8. The braking system of claim 1, wherein the frictional braking force generated by the friction braking system includes at least one selected from the group consisting of a mechanical braking force corresponding to the driver brake request and an amplified braking force.

9. A method for a braking a vehicle including a friction braking system and a regenerative braking system, the method comprising:

receiving a driver brake request;

determining a brake failure state, the brake failure state indicating a brake failure; and in response to determining the brake failure state, control each of a friction braking system and the regenerative braking system to apply a respective braking force based on the driver brake request, wherein a total braking force applied to each of the plurality of wheels includes a ratio of a regenerative braking force of the regenerative braking system and of a frictional braking force of the friction braking system, the ratio being determined based on a type of brake failure, a location of each wheel, and a split type of friction braking system.

10. The method of claim 9, wherein the friction braking system includes a brake booster and wherein determining a brake failure state includes determining a failure of functionality of the brake booster.

11. The method of claim 9, wherein the brake failure is one selected from the group consisting of a single brake circuit failure and a brake boost failure.

12. The method of claim 11, the method further comprising, when the brake failure is the single brake circuit failure and the friction braking system is a vertical split brake system, controlling the regenerative braking system to apply the regenerative braking force is applied to wheels on a single axle of the vehicle and to apply no regenerative braking force to wheels on a second single axle of the vehicle, and controlling the friction braking system to apply the frictional braking force to each of the plurality of wheels.

13. The method of claim 11, the method further comprising, when the brake failure is the single brake circuit failure and the friction braking system is a diagonal split brake system, controlling the friction braking system to apply the frictional braking force to a first wheel of the vehicle and a second wheel of the vehicle diagonal to the first wheel, and controlling the regenerative braking system to apply the regenerative braking force to wheels on to a single axle of the vehicle and to apply no regenerative braking force to wheels on a second single axle of the vehicle.

14. The method of claim 11, the method further comprising, when the brake failure state is a brake boost failure, controlling the regenerative braking system to apply the regenerative braking force to a single axle of the vehicle and to apply no regenerative braking force to wheels on a second single axle of the vehicle, and controlling the friction braking system to apply no frictional braking force to the plurality of wheels.

15. The method of claim 9, the method further comprising determining a battery capacity of the regenerative braking system and applying the regenerative braking force when the battery capacity exceeds a predetermined charge level.

16. The method of claim 9, wherein the frictional braking force generated by the friction braking system includes at least one selected from the group consisting of a mechanical braking force corresponding to the driver brake request and an amplified braking force.

* * * * *